United States Patent [19]

Stein

[11] Patent Number: 5,597,237
[45] Date of Patent: Jan. 28, 1997

[54] APPARATUS FOR MEASURING THE EMISSIVITY OF A SEMICONDUCTOR WAFER

[75] Inventor: Alexander Stein, Secaucus, N.J.

[73] Assignee: Quantum Logic Corp, Westport, Conn.

[21] Appl. No.: 450,659

[22] Filed: May 30, 1995

[51] Int. Cl.$^6$ .......................... G01N 25/00; G01N 21/47
[52] U.S. Cl. .................... 374/9; 356/236; 356/446; 250/228
[58] Field of Search ..................... 374/9, 126, 128; 356/446, 236; 250/228

[56] References Cited

U.S. PATENT DOCUMENTS

| | | | |
|---|---|---|---|
| 3,401,263 | 9/1968 | Birkebak | 374/9 |
| 3,698,813 | 10/1972 | Aisenberg | 374/126 |
| 4,120,582 | 10/1978 | De Vries et al. | 356/236 |
| 4,479,055 | 10/1984 | Perten | 250/338.1 |
| 4,575,252 | 3/1986 | Akiyama | 356/446 |
| 4,800,280 | 1/1989 | Satake | 250/339.11 |
| 5,098,195 | 3/1992 | Halyo et al. | 374/9 |
| 5,282,017 | 1/1994 | Kasindorf et al. | 374/126 |
| 5,308,161 | 5/1994 | Stein | 374/126 |
| 5,326,173 | 7/1994 | Evans et al. | 374/9 |
| 5,406,367 | 4/1995 | Sopori | 356/446 |
| 5,460,451 | 10/1995 | Wadman | 374/9 |

FOREIGN PATENT DOCUMENTS

| | | | |
|---|---|---|---|
| 0052744 | 3/1985 | Japan | 356/236 |
| 0228044 | 9/1988 | Japan | 356/446 |
| 0197807 | 7/1977 | U.S.S.R. | 356/446 |
| 0654853 | 3/1979 | U.S.S.R. | 356/446 |
| 1193543 | 11/1985 | U.S.S.R. | 356/236 |

*Primary Examiner*—Diego F. F. Gutierrez

[57] ABSTRACT

Apparatus adapted for use in measuring emissivity of a semiconductor wafer having a radiant energy reflecting surface includes a hollow integrating sphere having first and second spaced apart openings and having an inner surface upon which radiant energy can be distributed. The wafer is disposed with its reflecting surface adjacent the second opening. A first radiant energy detector is disposed on the inner surface of the sphere to detect the distributed energy. First means directs a beam of radiant energy through the first opening in the sphere in such manner that the beam passes through the sphere and the second opening to strike the wafer reflecting surface and is thereupon reflected into the sphere, the reflected energy being distributed upon the inner surface of the sphere and being detected by said first detector. Second means coupled to said first detector and responsive to its detected energy derives therefrom a first electrical signal proportional to the energy reflected from the reflecting surface of said wafer,

2 Claims, 2 Drawing Sheets

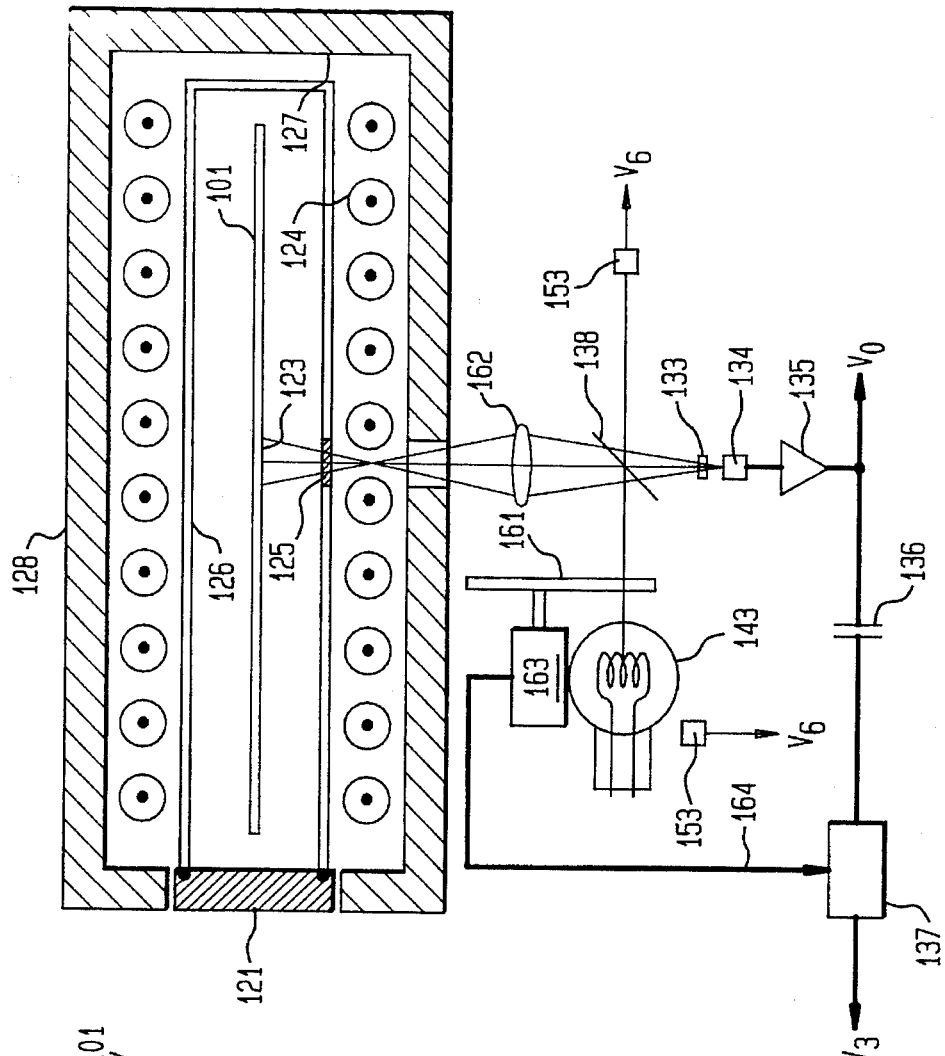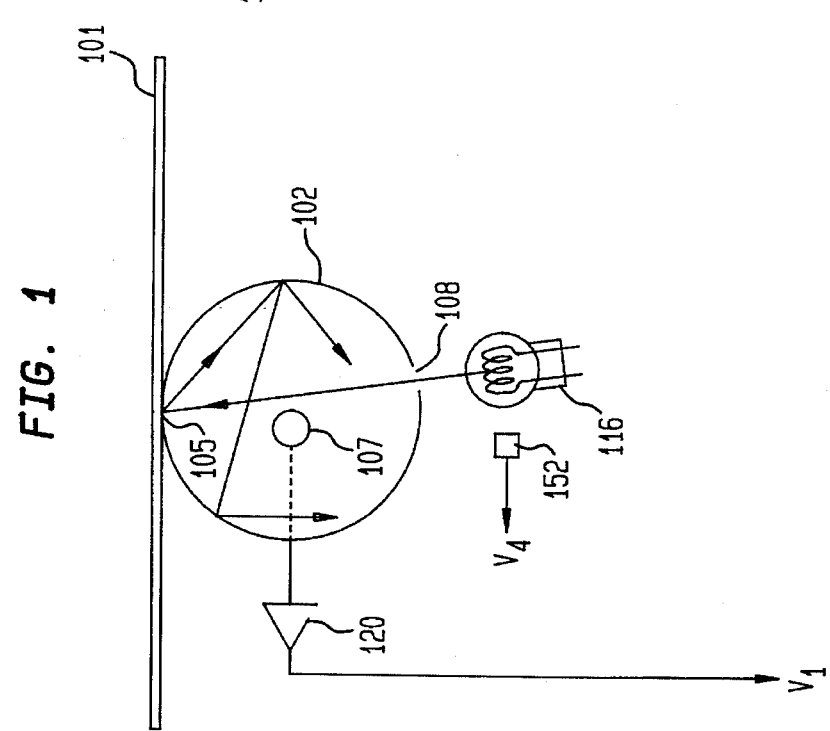

APPARATUS FOR MEASURING THE EMISSIVITY OF A SEMICONDUCTOR WAFER

BACKGROUND OF THE INVENTION

Semiconductor wafers are conventionally processed in batch type furnaces. In order to obtain higher resolution, a new process, known as rapid thermal processing, is steadily replacing batch furnace processing. In this process, a semiconductor wafer is heated by a bank of quartz lamps. The temperature of the wafer must be accurately measured, because inaccurate measurements can result in inefficient or even faulty processing.

For many reasons, infrared pyrometry is a preferred method of measuring wafer temperatures, but infrared measurements to date have suffered from errors which make the results unsatisfactory. The present invention provides a means for making infrared wafer temperature measurements with sufficient accuracy for many commercial applications.

Infrared pyrometers measure the thermal radiance L at a specified wavelength [$\lambda$] emitted by a hot object to calculate its temperature from the well known Planck equation $$L[\lambda] = Ec[\lambda]^{-5} \, [exp(d/[\lambda]T) - 1]^{-1} \quad [1]$$

where c and d are natural constants, T is the temperature of the target in degrees Kelvin; and E is the spectral emissivity of the target at wavelength [$\lambda$]. E is a function of the surface material, surface texture, angle of observation and even target temperature itself.

The value of L can be measured very precisely by an infrared pyrometer providing an electrical output signal $$Vo = KL \quad [2]$$

where Vo is obtained when the pyrometer is operated over a small spectral range centered about wavelength [$\lambda$] and K is an instrument constant. The temperature T can only be computed accurately as long as the emissivity E can be determined precisely.

It is known that the spectral emissivity E of any opaque body can be calculated from its spectral hemispherical reflectance Rh at the wavelength of operation by using the Kirchoff equation $$E = 1 - Rh. \quad [3]$$

Thus, this spectral emissivity can be calculated precisely when this reflectance Rh can be measured with precision.

In one known method, the target's retro-reflection is measured over a small known solid angle and the reflectance is then calculated. This is feasible when the angular reflectance pattern of the target surface is known. However, in most applications, the angular reflectance pattern is not known.

The angular reflectance of silicon wafers is not known, since the wafer surfaces have unknown angular reflectance patterns. Hence the value of the emittance is not known accurately using the above method and, therefore, the temperature cannot be measured to the accuracy desired. On the other hand, accuracy of temperature measurement is critical to successful processing of silicon wafers, wherein the wafer is placed inside of a reflecting chamber and is heated by powerful lamps within seconds to temperatures as high as 1300 degrees Centrigrade.

The present invention is directed toward apparatus which enables the emittance of wafer surfaces of arbitrary textures to be accurately measured whereby the temperature can be calculated accurately.

SUMMARY OF THE INVENTION

When a wafer remains opaque at all temperatures of interest, its hemispherical reflectance Rh is measured at ambient temperature, using an integrating sphere, before the wafer is placed inside the heating chamber. The wafer is then placed inside the chamber. Before the wafer is heated inside the chamber, a retro-reflectance measurement is made and an instantaneous retro-reflectance electrical signal V3 at ambient temperature is obtained.

It is known that the retro-reflectance and the hemispherical reflectance of a silicon wafer both change as the wafer is heated and processed. It is also known that the ratio of the hemispherical reflectance to the retro-reflectance remains constant as the wafer is heated and processed as long as the wafer remains opaque at all temperatures of interest.

Consequently, using this ratio, with Rh as measured at ambient temperature, V3, the instantaneous retro-reflectance electrical signal as measured at ambient temperature within the furnace and V'3 the instantaneous retro-reflectance electrical signal at the heated temperature, the Kirchoff formula becomes:

$$E = 1 - Rh[V'3/V3] \quad [4]$$

The instantaneous signals Vo and V'3 are obtained electronically and the wafer temperature is calculated using equations [1], [2] and [4].

When the wafer is transparent at ambient temperature and becomes opaque at elevated temperatures, the total wafer reflectance at ambient temperature is a superposition of multiple reflections between the two opposite wafer surfaces. The relationships between the surface reflections, the internal wafer transmission and the external reflections and transmission values are defined by the known Etalon equations:

$$R1 = r_1 + \{[1-r_1]^2 \, t^2 r_2\}/\{1-r_1 r_2 t^2\} \quad [5]$$
$$R2 = r_2 + \{[1-r_2]^2 t^2 r_2\}/\{1-r_1 r_2 t^2\} \quad [6]$$
$$\tau = \{1-r_1]t[1-r_2]\}/\{1-r_1 r_2 t^2\} \quad [7]$$

where R1 and R2 are the effective hemispherical reflectivities measured for illumination from the backside and front side respectively of the wafer; $r_1$ and $r_2$ are the surface reflectivities for the wafer back and front respectively, t is the internal wafer transmission and $\tau$ is the external wafer transmission. R1, R2 and $\tau$ can be measured and the two surface reflectivites and the internal wafer transmission values are calculated using the three simultaneous equations [5], [6] and [7].

The calculated value $r_1$ is the back surface hemispherical reflectance of the wafer if the wafer were opaque. At elevated temperatures, all wafers become opaque and the retro-reflectance electrical signal $V^+3$ at that point is proportional to $r_1$. During the heat up period wherein the wafer temperature is raised from ambient to such elevated temperatures, the chemical makeup of the wafer undergoes no material change whereby the value $r_1$ can be substituted for Rh in equation [4] as follows:

$$E=1-r_1[V'3/V^+3] \qquad [8]$$

The wafer temperature can be calculated in the same manner as before, provided that the value V'3 can only be used after the wafer has been heated to the opacity temperature.

BRIEF DESCRIPTION OF THE DRAWINGS

FIG. 1 illustrates the use of a single integrating sphere as employed in the invention when a wafer is opaque at all temperatures of interest.

FIG. 2 illustrates a heating chamber and associated circuitry which cooperates with the single sphere of FIG. 1.

DETAILED DESCRIPTION OF PREFERRED EMBODIMENTS

Figure 3:
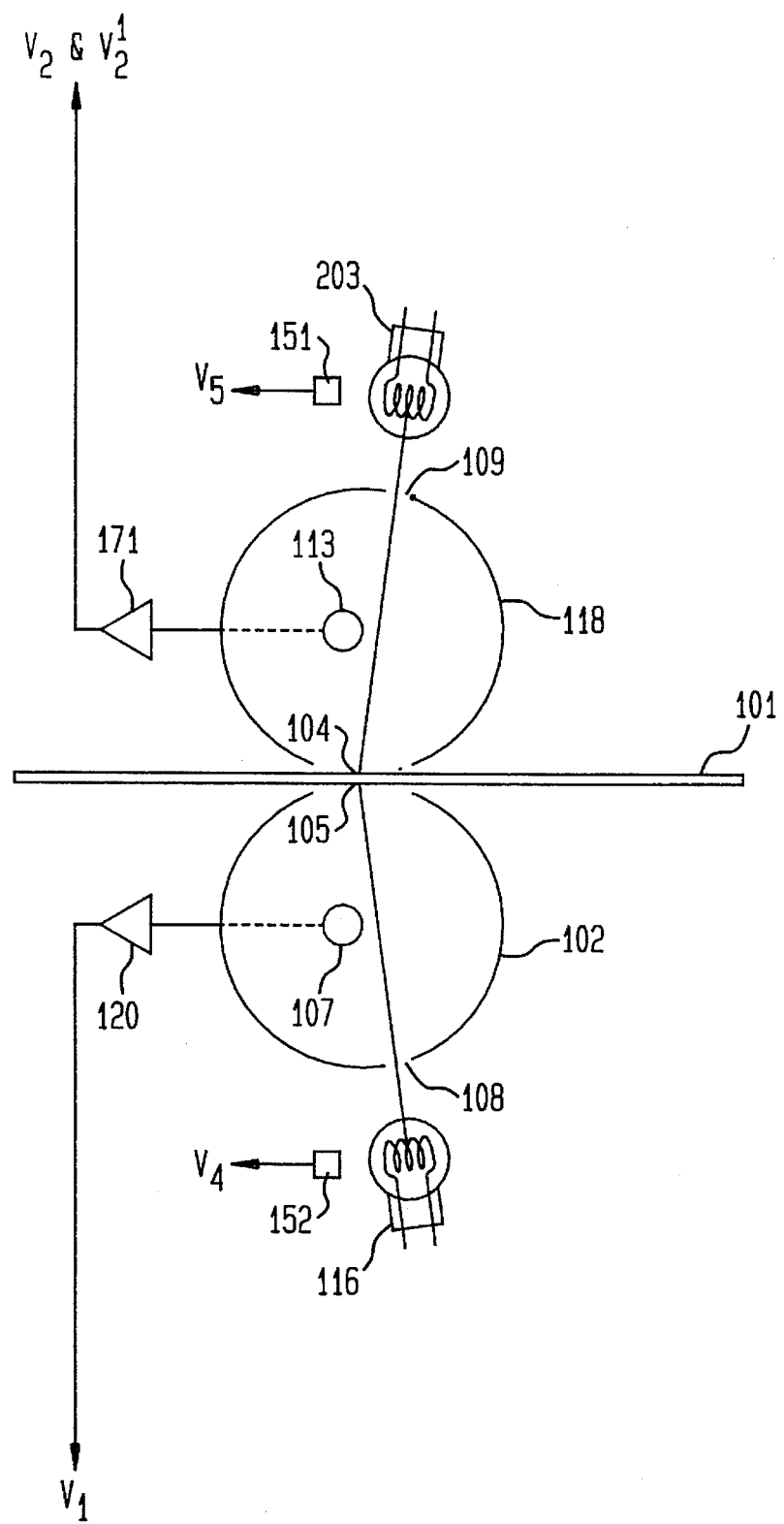
FIG. 3 illustrates the use of two integrating spheres as employed in the invention when a wafer is opaque only at elevated temperatures.

Referring first to FIG. 1, integrating sphere 102 has an upper opening 105 and a lower opening 108. Wafer 101 is placed above the sphere with its lower surface close to opening 105. Infrared source 116 directs a beam through opening 108, the interior of the sphere, and opening 105 to strike the wafer.

The energy in the beam impinging upon the wafer is reflected into the sphere 102 and is uniformly distributed over the interior surface. Infrared detector 107, disposed at a point on this surface, responds to the distributed energy to produce a signal which is amplified in amplifier 120. Amplifier 120 yields a voltage V1 which is proportional to the total energy reflected from the wafer into hemispherical space.

An optical filter can be placed in front of detector 107 to select a spectral band which will become the operating band of an infrared thermometer shown in FIG. 2. Typically, this band is 2.7 um.

Since the intensity of source. 116 can vary over time, its output is monitored by photo sensor 152 which yields a voltage V4 which is used to normalize V1. Normalized voltage V1 is proportional to the hemispherical reflectance and is stored in a system computer.

Referring now to FIG. 2, the wafer 101 is moved into a rapid thermal processing chamber 128 via gate 121. Chamber 128 has reflective walls 127 lined with powerful heating lamps 124. The heating lamps irradiate the wafer and the chamber walls. The walls in turn reflect the energy back towards the wafer and heat it. An OH-doped quartz tube 126 isolates the wafer from the atmospheric environment but transmits most of the heating lamp radiation.

A chopper wheel 161 is mounted on the shaft of motor 163. An infrared source 143 produces an infrared beam which is modulated by passing through the chopper wheel 161 and then strikes beam splitter 138 and is divided into two beams. One beam illuminates target spot 123 on wafer 101 and is reflected. The infrared thermometer operating on the spectral band 2.7 um previously described includes lens 162, photo detector 134 and filter 133 and intercepts the beam reflected from the wafer. The wafer is heated so that thermal radiation is emitted from spot 123. This radiation is also intercepted by the thermometer.

Tube 126 absorbs at 2.7 um and prevents the heater lamp radiation at this wavelength from striking the wafer and being reflected into detector 134. A small probe window 125 in tube 126 transmits the wafer thermal radiation as well as incident and reflected radiation from source 116 at 2.7 um, unencumbered by reflected radiation from the heating lamps at the 2.7 um operating band.

The self-emitted thermal radiance is essentially constant. Consequently, the photo current output of detector 134 consists of a direct current component proportional to the thermal radiance and an alternating current component proportional to the modulated probe radiation and hence proportional to the retro-reflectivity of the wafer, both at operating band 2.7 um. The transimpedance amplifier 135 converts the direct current component into a proportional voltage signal Vo. The alternating current component is separated from the direct current component by capacitor 136 and is fed to synchronous rectifier 137 which generates signal V3, proportional to the alternating current component and hence to the retro-reflectivity. The motor 163, via lead 164, sends a timing signal to rectifier 137.

Since the intensity of source 143 can change with time, the second beam yielded by the beam splitter 138 is monitored by photo sensor 153 which generates signal V6 which is used to normalize the signal V3. During wafer heating and processing, the signals Vo, V3 and V6 are sampled periodically by the system computer, which first normalizes V3 using V6, and then calculates the wafer temperature, using the stored value V1 and equations [1], [2] and [4].

Referring now to FIG. 3, wafer 101 is inserted between two closely spaced integrating spheres 102 and 118. The lower surface of wafer 101 is placed on top of opening 105 of sphere 102. The components 102, 107, 120, 108, 105, 116 and 152 are identical with the components shown in FIG. 1 and are interconnected in the same manner.

Wafer 101 is also placed below the sphere 118 with its upper surface close to opening 104. Sphere 118 contains Infrared source 203.

In the structure shown in FIG. 3, the wafer is not opaque at room temperature so that the energy in a beam produced in one of the spheres 102 and 118 and impinging upon either surface of the wafer is partially reflected into a corresponding one of spheres 102 and 118 and partially is transmitted via the body of the wafer and then out of its opposite surface into the other one of the spheres 102 and 103.

When source 116 is energized and source 203 is not energized, Infrared source 116 directs a beam through opening 108, the interior of the sphere, and opening 105 to strike the wafer.

The energy in the beam impinging upon the wafer is partially reflected into the sphere 102 and partially transmitted through the wafer into the sphere 118. The portion that is transmitted passes through opening 104 of the sphere 118 and is distributed uniformly on its inner surface. Infrared detector 113 disposed at a point on this surface, responds to the distributed energy to produce a signal which is amplified in amplifier 171. Amplifier 171 yields a voltage V2 which is proportional to the total energy transmitted through the wafer.

The portion of the beam that is reflected is processed in the same manner as in FIG. 1 and amplifier 120 yields a voltage V1 which is proportional to the total energy reflected from the lower surface of the wafer.

When source 203 is energized and source 116 is not energized, Infrared source 203 directs a beam through opening 109, the interior of the sphere, and opening 104 to strike the the upper surface of the wafer.

The energy in the beam impinging upon the upper surface of the wafer is reflected into the sphere 118 and partially transmitted through the wafer into the sphere 102. The reflected energy is uniformly distributed over the interior surface of sphere 118. Infrared detector 113, disposed at a point on this surface, responds to the distributed energy to produce a signal which is amplified in amplifier 171. Amplifier 171 yields a voltage V'2 which is proportional to the total energy reflected from the upper surface of the wafer.

Optical filters can be placed in front of detectors 107 and 113 to select a spectral band which will become the operating band of an infrared thermometer shown in FIG. 2. Typically, this band is 2.7 um.

Since the intensity of source 203 can vary over time, its output is monitored by photo sensor 151 which yields a voltage V6 which is used to normalize V'2.

Voltages V1, V2 and V'2, normalized as needed, can be stored in the system computer and used to solve the three simultaneous equations [5], [6], and [7]. Thereafter, the wafer temperature can be calculated as previously explained.

Radiation sources and radiation detectors operating in wavelengths other than the infrared can be used in place of the infrared detectors shown in FIGS. 1 and 3.

While the invention has been described with particular reference to the drawings and preferred embodiments, the protection sought is to be limited only by the terms of the claims which follow.

What is claimed is:

1. Apparatus adapted for use in measuring emissivity of a semiconductor wafer having first and second oppositely disposed reflecting surfaces, a portion of any radiant energy directed upon either surface passing through the wafer and its other surface, said apparatus comprising:

a first hollow integrating sphere having first and second spaced apart openings and having an inner surface upon which radiant energy can be distributed, said wafer being disposed with the first reflecting surface adjacent the second opening;

a second hollow integrating sphere having third and fourth spaced apart openings and having an inner surface upon which radiant energy can be distributed, said wafer being disposed with the second reflecting surface adjacent said fourth opening;

a first radiant energy detector disposed on the inner surface of the first sphere to detect the energy distributed thereon;

a second radiant energy detector disposed on the inner surface of the second sphere to detect the energy distributed thereon; first means to direct a beam of radiant energy through said first opening in said first sphere in such manner that the beam passes through the first sphere and the second opening to strike the first wafer reflecting surface and is thereupon reflected into the first sphere, the reflected energy being distributed upon the inner surface of the first sphere and being detected by said first detector;

second means to direct a beam of radiant energy through said third opening in said second sphere in such manner that the beam passes through the second sphere and the fourth opening to strike said second reflecting surface of said wafer and is thereupon reflected into the second sphere, the reflected energy being distributed upon the inner surface of the second sphere and being detected by said second detector;

third means coupled to said first detector and responsive to its detected energy to derive therefrom a first electrical signal proportional to the energy reflected from said first reflecting surface of said wafer; and fourth means coupled to said second detector and responsive to its detected energy to derive therefrom a second electrical signal proportional to the energy reflected from said second reflecting surface of said wafer.

2. Apparatus as set forth in claim 1 wherein one of the first and second means can be disabled while the other of said first and second means is actuated and a portion of the beam produced by the actuated one of the first and second means is transmitted through the wafter and is distributed on the surface of the sphere associated with the disabled one of the first and second means whereby the one of the third and fourth means associated with the deactuated one of the the first and second means yields a third electrical signal proportional to the energy transmitted through the wafer.

* * * * *